United States Patent [19]

Joel, Jr.

[11] 3,859,479

[45] Jan. 7, 1975

[54] MONITORING ARRANGEMENT FOR A STEP-BY-STEP SWITCHING TRAIN

[75] Inventor: Amos Edward Joel, Jr., South Orange, N.J.

[73] Assignee: Bell Telephone Laboratories, Incorporated, Murray Hill, N.J.

[22] Filed: May 29, 1973

[21] Appl. No.: 364,937

[52] U.S. Cl. .......................................... 179/175.21

[51] Int. Cl. .......................................... H04m 3/24

[58] Field of Search............. 179/175.21, 175.2 R, 179/175.31 R, 175.3 R, 84 VF, 175.2 C

[56] References Cited

UNITED STATES PATENTS

| | | | |
|---|---|---|---|
| 3,335,234 | 8/1967 | Haenschke | 179/175.2 R |
| 3,450,847 | 6/1969 | Barnes | 179/175.31 R |
| 3,562,434 | 2/1971 | Ohzeki | 179/84 VF |
| 3,581,283 | 5/1971 | Reddel | 179/84 VF |
| 3,627,933 | 12/1971 | Garrett | 179/175.2 R |

*Primary Examiner*—Kathleen H. Claffy
*Assistant Examiner*—Douglas W. Olms
*Attorney, Agent, or Firm*—H. R. Popper

[57] ABSTRACT

An arrangement is disclosed for identifying which switch in a plurality of selector switches arranged in a switching train may be operating incorrectly. All of the selector switches of the step-by-step switching train are modified so that each switch superimposes a distinctive combination of audio frequency tones on the sleeve holding ground that the selector normally applies during the temporary interval that it is responding to dial pulses. Scanning the trunks at the input of the switching train for the appearance of the tone frequencies enables a record to be made of any tone which persists for longer than the normal selector operate time.

18 Claims, 5 Drawing Figures

MONITORING ARRANGEMENT FOR A STEP-BY-STEP SWITCHING TRAIN

BACKGROUND OF THE PRIOR ART

This invention relates to switching systems and more particularly to arrangements for assuring the proper operation of step-by-step switching trains.

The step-by-step or Strowger switch is one of the most widely used switching mechanisms in the telephone industry. Millions of telephone lines are served by switching systems made up of multiple arrays of step-by-step switches. Even though the art has seen the introduction of crossbar switches, electronic crosspoints, marker control, and, more recently, stored program controlled systems, nevertheless the economic investment in installed step-by-step networks is so great that these switching systems will have to remain in service for many years to come. As the installed step-by-step switching trains age, the incidence of incompleted calls and other service deficiencies tends to increase.

Switch or wiring troubles in the step-by-step system may occur in several ways. If a switch is out of adjustment it may not step in the vertical or in the rotary direction or it may not release. If its shaft is not aligned properly its wipers may not turn into the selected level after vertical stepping. The brushes may snag. In most of these cases the dial pulses received by the switch will be ineffective and no hunting operation will take place. The B relay for the selector or connector in trouble will remain operated while the A relay receives the digit(s) intended to operate the switch as well as the pulses for any digits intended to operate succeeding switches. Thus the call sticks at this stage.

If there are open contacts or broken wires the selector hunting operation may be affected and prevent cut-through to the next stage. If the A and B relays do not operate, then the D relays of all previous selectors in the train will start to release. If an earlier A relay operates, the train is held somewhere with a partially dialed call.

While the more recent common control switching systems have automatic maintenance features which routinely monitor system operation, the step-by-step system is generally bereft of automatic system maintenance facilities. Because two successive calls arriving over the same incoming trunk and destined for the same telephone station can traverse a variety of different paths through the terminating switching train of a telephone local office, it is difficult to determine just which of the many step-by-step switches is responsible for a call failing to complete.

As is well known, a step-by-step switching train exists for the purpose of providing a connection path between a line and a trunk. An incoming or terminating switching train begins its operation with an incoming trunk seizing an incoming step-by-step selector. In most systems using seven-digit directory numbers, the incoming trunk will have been selected by the first three or ABC digits of the called number. Thereafter, the incoming selector, also sometimes called a fourth selector, is controlled in accordance with the fourth called number digit to raise its tip, ring, and sleeve wipers to a level corresponding to the fourth dialed digit and then to hunt across the terminals on that level to find an idle fifth selector. In the hunting operation, the fourth selector examines the potential of the sleeve terminals of the fifth selectors appearing on its terminal bank, by-passes those fifth selectors having grounded sleeve terminals and stops on the first fifth selector exhibiting battery potential on its sleeve. The fifth selector is then seized, its operation controlled in accordance with the next successive dialed digit and so on throughout remainder of the terminating switching train until the connector serving the called line is operated. Because it is impossible to predict at the inception of a call which one of the plurality of incoming trunks and fourth and fifth selectors will carry the call, troubleshooting the system is difficult.

In one prior art method proposed for monitoring the operation of step-by-step switching trains disclosed in D. G. Haenschke U.S. Pat. No. 3,335,234 issued Aug. 8, 1967, the selectors and connectors of the switching train are modified. These modifications make it possible when a sample call is selected to verify the pulses sent to the switch magnets for both dial and rotary trunk hunting pulses. Unfortunately, the verification signal developed in that arrangement is weak and can be detected only within the office being monitored. Further, the cost of making the modification is rather high since each selector must be removed from its mounting and special components added thereto.

It is accordingly, an object of the present invention to facilitate the performance of routine maintenance in step-by-step switching systems. The invention may be applied to any system where calls are established progressively through a plurality of stages.

SUMMARY OF THE INVENTION

The foregoing and other objects of my invention are achieved in one illustrative embodiment in which I superimpose on the ground which a selector normally applies to its sleeve terminal during the time that is responding to its particular sequence of dial pulses, a distinctive tone frequency combination uniquely identifying the office, switching stage, frame and switch numbers. The tone so applied to the sleeve lead finds its way back through the switching train to the sleeve lead of the incoming trunk. The sleeve leads of incoming trunks are scanned and the duration of the tones appearing thereon is monitored. After a particular selector has completed its response to its particular sequence of dial pulses, the call should proceed to a subsequent selector in the switching train. At this time the tone is removed and the selector is held by the normal sleeve ground. If, however, the selector does not complete its response to the dial pulses, the tone will remain for longer than the normal operating time of the selector and will be detected by the scanner.

In an alternative embodiment of my invention, the scanner may be located at an office remote from the one containing the inward switching train being monitored. In this embodiment I modify the incoming trunk of the monitored office by adding a simplex coupling circuit from the sleeve of the incoming trunk to its tip and ring conductors. In this manner, the tone applied by the operating selector in the inward switching train forwarded back over the sleeve leads of the chain to the incoming trunk may be coupled over the tip and ring leads of the incoming trunk to the remote monitoring office.

In accordance with one aspect of my invention, a total of 56 tone frequencies are distributed by a coupling matrix to the selectors of an incoming step-by-step switching train.

These tones are applied to the sleeve by opening a ground supply terminal on the jack of the selector mounting. These terminals of the selectors are then wired over to the tone frequency generating equipment which generates combinations of tone frequencies. The ground that is removed is the ground normally applied over an operated make contact of the B relay of the selector which is a slow release relay held operated during the release of the A or dial pulse following relay of the selector. The ground provided over this make contact normally "holds up" the prior switching stages during the time that the given selector is responding to the dial pulses and is normally removed once the selector has fully been controlled in accordance with its respective sequence of dial pulses. I provide an alternative operating ground to this B relay contact on which is superimposed a distinctive combination of audio tone identifying frequencies. Generally, the selector B relay is operated for only about 2 seconds, most of it during the interdigital time. However, if a drop or an overflow condition is encountered, the operated B relay contact will now apply the distinctive identifying tone for a longer period of time perhaps 10 seconds or so until the caller becomes impatient with the lack of call progress and hangs up. During this interval of time, the scanner at the incoming trunk of the office under surveillance or at a remote monitoring office will detect the tones persisting for longer than the 2-second interval and make a trouble entry record. The entry may then be used by maintenance personnel to locate and repair selector switches that are not operating properly.

The foregoing and features of my invention may become more apparent from the ensuing detailed description and drawing in which.

Figure 1:
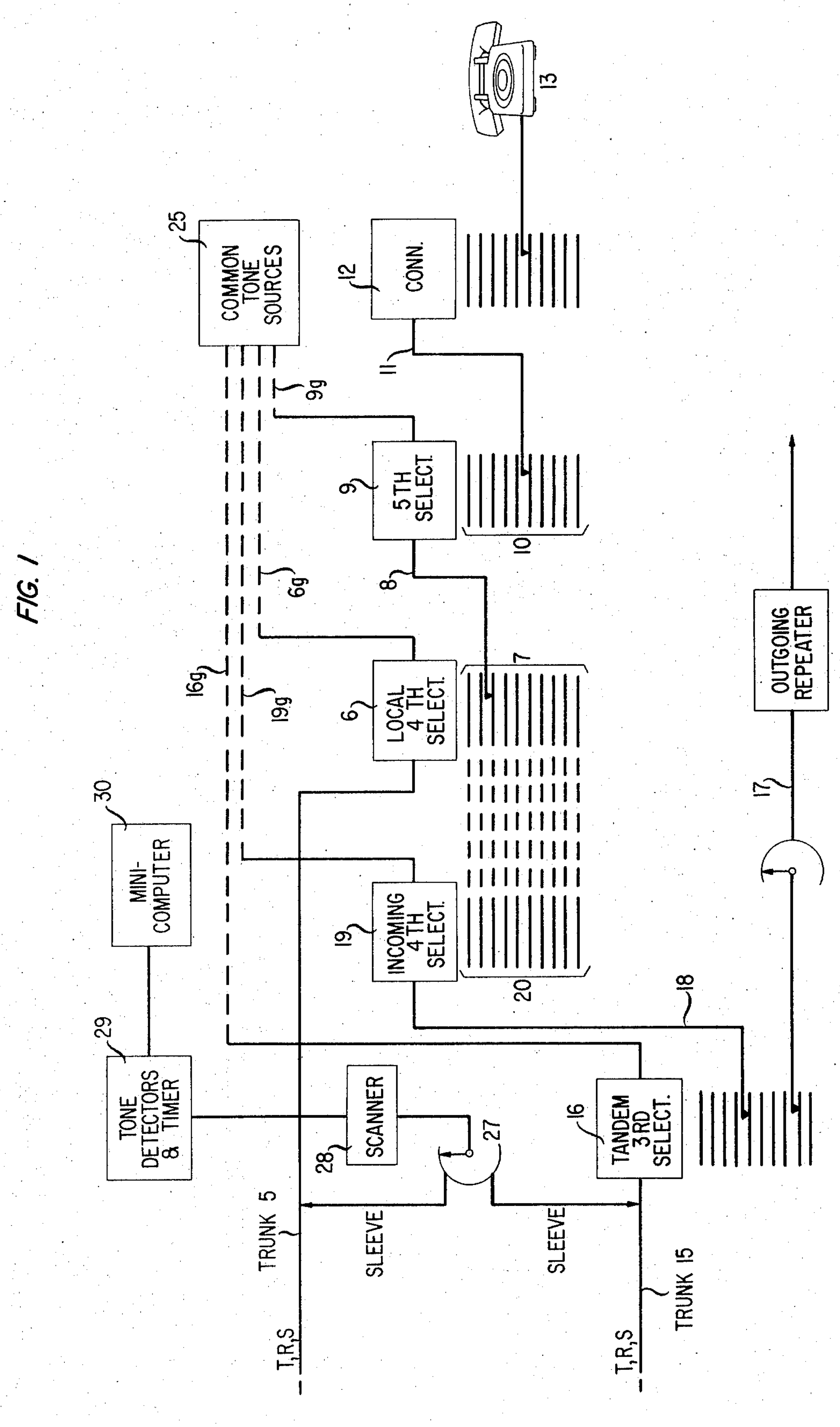
FIG. 1 shows an illustrative inward switching train of a step-by-step office modified in accordance with my invention.

Referring now to FIG. 1 there is shown a switching train of a step-by-step switching office which includes a tandem switching stage. A local trunk 5 at the left-hand side of the figure is associated with a local fourth selector 6 and controls selector 6 in accordance with the fourth digit dial pulses of the called number recieved from the preceding stages (not shown) of the switching train. From each level of the selector bank terminal 7 of selector 6, paths lead to fifth selectors such as path 8 leading to fifth selector 9. The fifth selector 9 is controlled in accordance with the fifth digit of the called number dial pulse sequence. From the bank 10 of the fifth selector 9, paths lead to connectors such as path 11 leading to connector 12. Connector 12 is controlled in accordance with sixth and seventh digits of the dialed number to complete the connection to the called party's telephone set 13.

Alternatively, a call may arrive over tandem trunk 15 to control tandem third selector 16 to select either a path 17 to a trunk outgoing to another telephone office or a path 18 leading to an incoming fourth selector 19, the banks 20 of which are in multiple with the banks 7 of local fourth selector 6.

The circuitry which has thus far been described in FIG. 1 is the well-known switching train of a step-by-step central office. In accordance with my invention, however, I provide each of the selectors 16, 19, 6, and 9 with a unique alternating current tone signal over its respective sleeve ground supply lead 16*g*, 19*g*, 6*g*, and 9*g* from a common tone source supply 25. Each of the selectors is enabled to apply its respective tone signal back over the sleeve path 15; 18, 15; 5; or 8, 5 so that the tone appears on the sleeve lead of trunk 15 or 5 on the switch bank 27 of the scanner 28. Scanner 28 systematically "looks at" the sleeve potentials of the trunks appearing on switch bank 27. Scanner 28 does not stop on any terminal whose sleeve lead exhibits an idle condition which, in most conventional step-by-step switching systems, is negative battery, usually −48 volts. Scanner 28 will also pass by any trunk sleeve terminal that exhibits the conventional "ground busy" potential. However, tone detectors and timers 29 will cause the scanner to stop at a trunk sleeve terminal which exhibits one of the destinctive audio tone signals superimposed on ground. Tone detector and timer circuit 29 commence timing when scanner 28 has stopped on a sleeve terminal. If the tone is removed before the timer times out, the selector then being observed by scanner 28 and tone detectors 29 is assumed to be operating correctly. Tone detectors 29 may then register the tones detected in minicomputer 30 indicating that a particular stage in the step-by-step switching train is operating satisfactorily. If a detected tone persists after a predetermined interval which is longer than the normally expected operate time of a selector, the timer in tone detector 29 will time out and tone detectors 29 will make an entry of the detected tones and the occurrence of a time-out signal in minicomputer 30. The information stored in minicomputer 30 may then be used by service personnel to make an inspection of the malfunctioning selector to determine the exact cause of trouble.

When tone detectors and timer 29 have observed a tone signal which is removed within the predetermined selector operate time, scanner 28 will be instructed either to recommence hunting for another busy trunk on the banks of switch 27 or scanner 28 will be allowed to remain in connection with the trunck observed. If the tone detected was one from tandem third selector 16, the tone should be followed shortly by a tone from incoming selector 19 and then by a tone from fifth selector 9. Similarly, if the tone observed was from a fourth selector 6 that tone should be followed after a short interval by a tone from fifth selector 9. In each of these instances, the scanner will remain in connection with the respective sleeve terminal of trunk 5 or 15 until the appropriate tone is detected from fifth selector 9. If a selector in the switching train fails to remove its tone within its predetermined operate time, a time-out entry will be made by tone detectors and timer 29 in minicomputer 30.

Figure 2:
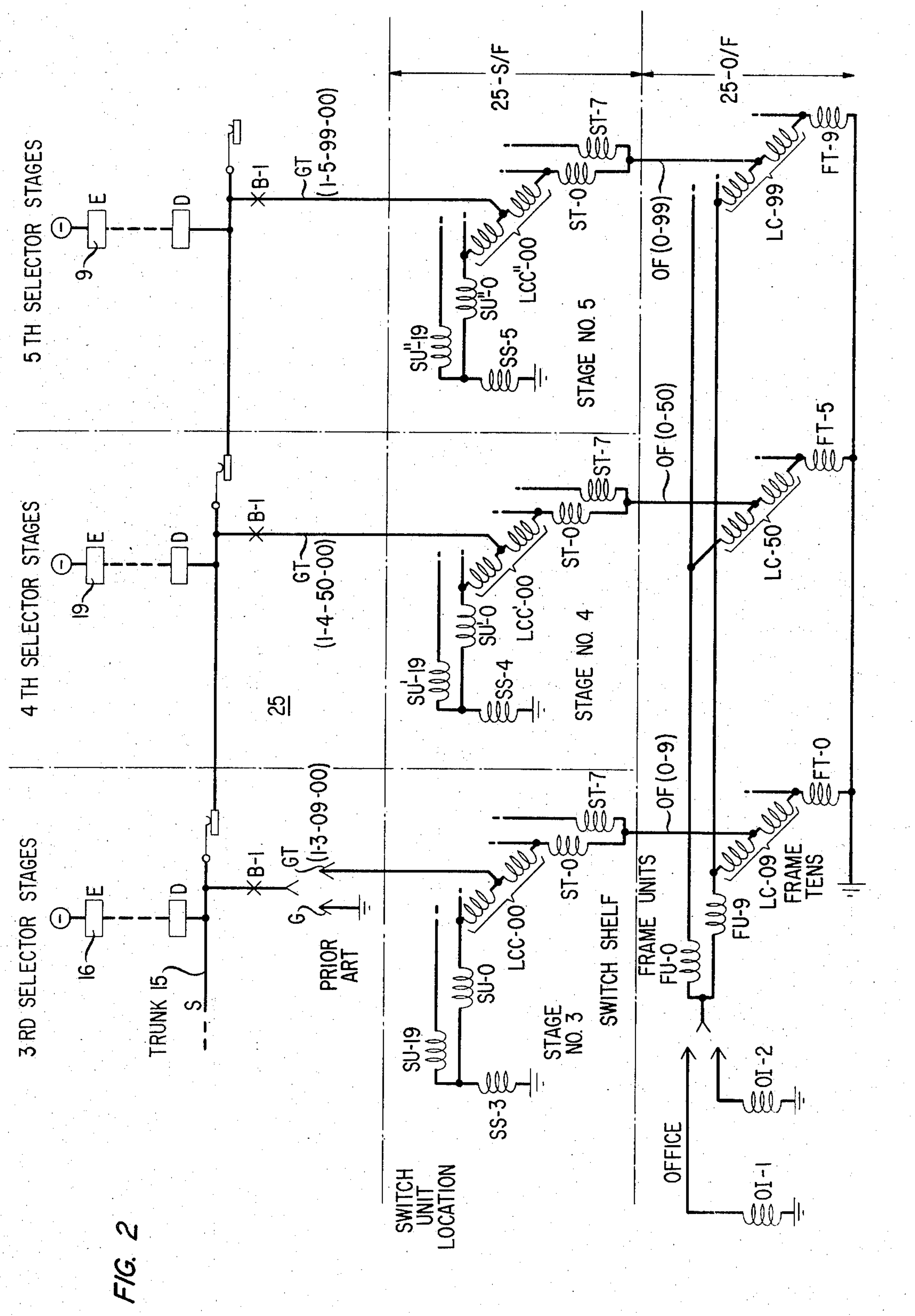
FIG. 2 shows the details of applying the unique identifying tones to the selectors.
Figure 3:
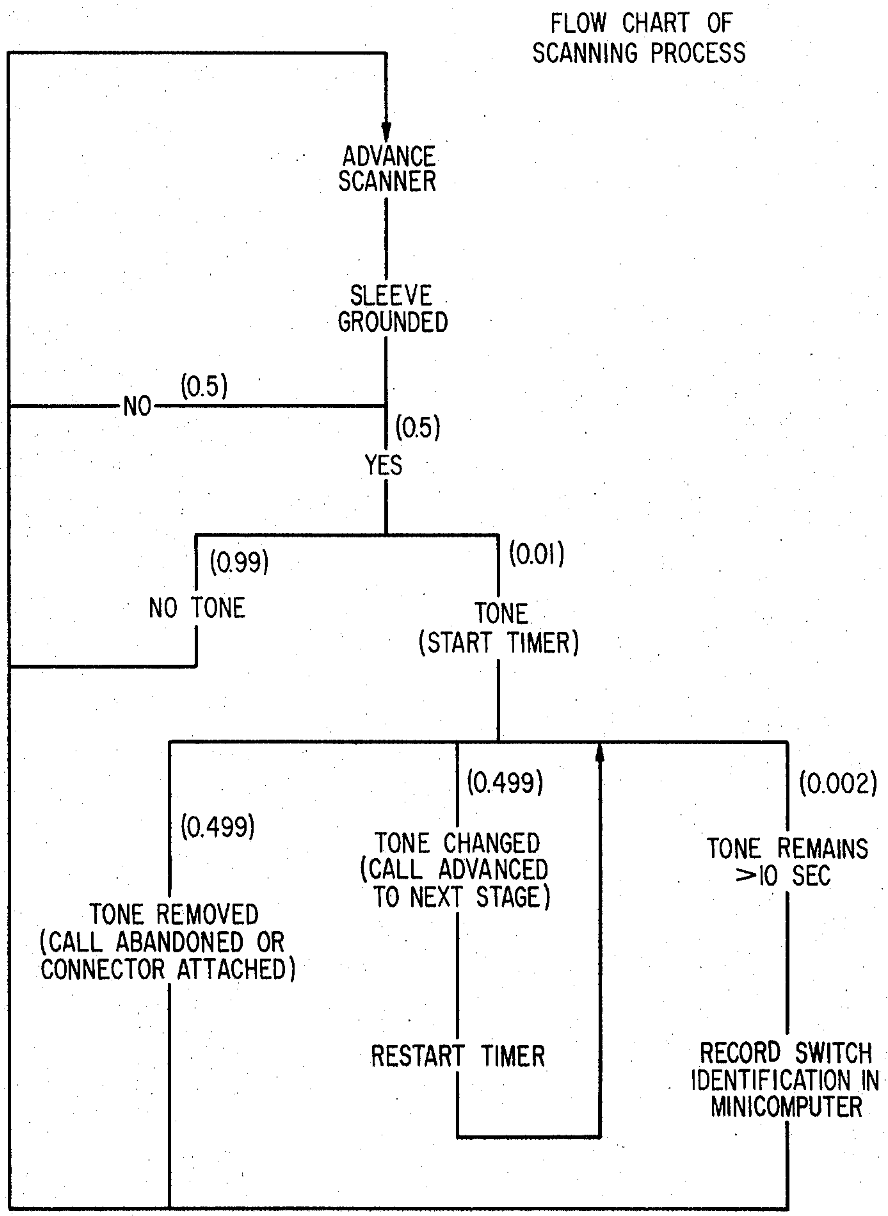
FIG. 3 shows a flow chart of the process performed by the tone monitoring scanner.

Referring now to FIG. 2, there is shown relevant portions of the control circuitry of tandem third selector 16, incoming fourth selector 19, and fifth selector 9. For the sake of focusing the figure on the circuitry relative to the invention most of the conventional wiring associated with the A, B, C, D, and E relays has been omitted as well as the paths of the tip and ring leads. The sleeve lead S of trunk 15 is shown at the upper left-hand portion of the figure. As is well known prior to the control of selector 16 by the third dialed digit, idle battery potential appears on sleeve lead S of trunk 15 from selector 16 battery and a path including the windings of selector 16's E and D relays. When selector 16 is seized over the tip and ring conductors not explicitly shown of trunk 15, the A or dial pulse following relay of the selector operates and in turn operates a slow release B relay also not shown. The operation of the B relay closes make contact B–1 to normally apply ground G to sleeve S of trunk 15. This ground is applied to the selector at its appearance on the switching frame.

In accordance with my invention, I disconnect the conventional ground supply wire G of selector 16 (and of all the other selectors in the switching train) and connect in its place a wire GT to contacts B–1. Each selector sleeve lead is wired to a unique coordinate in the switch/frame tone distribution matrix 25–S/F of common tone sources 25 via a respective GT lead. The GT leads are numbered according to office, stage, frame and switch number. The common tone source network 25 is arranged to distribute 56 different tone frequencies to selector sleeve leads. Sufficient frequencies may be provided if the lowest frequency employed is 300 or 400 Hertz and if the frequencies are separated from each other by approximately 40 Hertz. Obviously, the frequencies that are conventionally used for trunk supervision purposes such as 2,620 Hertz, etc., should not be employed in common tone sources 25.

The 56 tones are distributed to the sleeve leads by common tone source distribution matrices 25–S/F and 25–O/F to identify the office switching stage, switching frame and switch location and shelf number of the selector that is responding to a dial pulse sequence. One of two office identifying frequencies are applied via windings OI–1 through OI–2 in series with the array of frame units identifying windings FU–O through FU–9.

If it is assumed that a given office may have up to 100 switching frames, 10 frequencies will be required to represent the units digits and 10 frequencies will be required to represent the tens digits of the frame identifying numbers.

For the sake of simplifying the drawing the primary windings of all of the transformers shown in FIG. 2, as well as the tone source generators driving these windings have been omitted. The provision of such primary windings and generators should be apparent to those skilled in the art. The frame units identifying windings FU–O through FU–9 and the frame tens identifying windings FT–0 through FT–9 are connected to vertical risers OF- by coupling bridges LC- in particular combinations to supply pairs of frame units digit and frame tens digit identifying frequencies. For example, the lower left-most section of matrix 25–O/F shows vertical riser OF[O–9] being supplied from the upper part of coupling bridge LC–09 with a frequency identifying frame unit 9 (on which winding OI–1 superimposes a frequency identifying office 1) being supplied from the lower part of coupling bridge LC–09 with a signal from winding FT–0 which identifies the frame tens digit 0. Accordingly, there will appear on vertical risers OF a combination of three frequencies representing the office number and the frame tens and units numbers, respectively.

The middle third of FIG. 2 contains matrix 25–S/F of tone source 25. Each stage of matrix 25–S/F contains one of three series of switch unit identifying windings SU–O through SU–19, SU′–O through SU′–19 or SU″–0 through SU″–19. In series with all of windings SU–0 through SU–19 is third stage identifying winding SS–3. In series with all of windings SU′–0 through SU′–19 is fourth stage identifying winding SS–4. In series with all of windings SU″–0 through SU″–19 is fifth stage identifying winding SS–5. It will be apparent that when common tone source 25 is connected as source 25′ in FIG. 4 that additional first and second stage identifying windings SS–1 and SS–2 (not shown) would be employed in similar fashion to identify the first and second selector stages of an originating step-by-step office switching train.

Switch shelf indentifying windings ST–0 through ST–7 are connected to leads GT- via the lower half of coupling bridges LCC–00 through LCC–99 to provide frequencies identifying the switch shelf numbers. Each of windings ST–0 through ST–7 is connected at its lower end to a respective one of vertical risers OF- such that there is supplied in series with each of the switch shelf identifying windings the three frequencies identifying the office number, frame units number and frame tens number.

Through the upper half of coupling bridges LCC–00 through LCC–99 there are provided to leads GT- the two frequencies representing the particular switching stage and switch unit location identifying numbers. Accordingly, each GT- lead provides to the sleeve conductor S a distinctive pattern of six frequencies identifying the office number, stage number, frame tens and units numbers, and switch location and shelf numbers. The upper and lower halves of coupling bridges LCC- prevent the switch location frequencies from being coupled into the shelf number supply, and vice versa. Similarly, the upper and lower sections of coupling bridges LC- prevent the frame units identifying frequencies from being coupled into the frame tens identifying windings, and vice versa.

Figure 4:
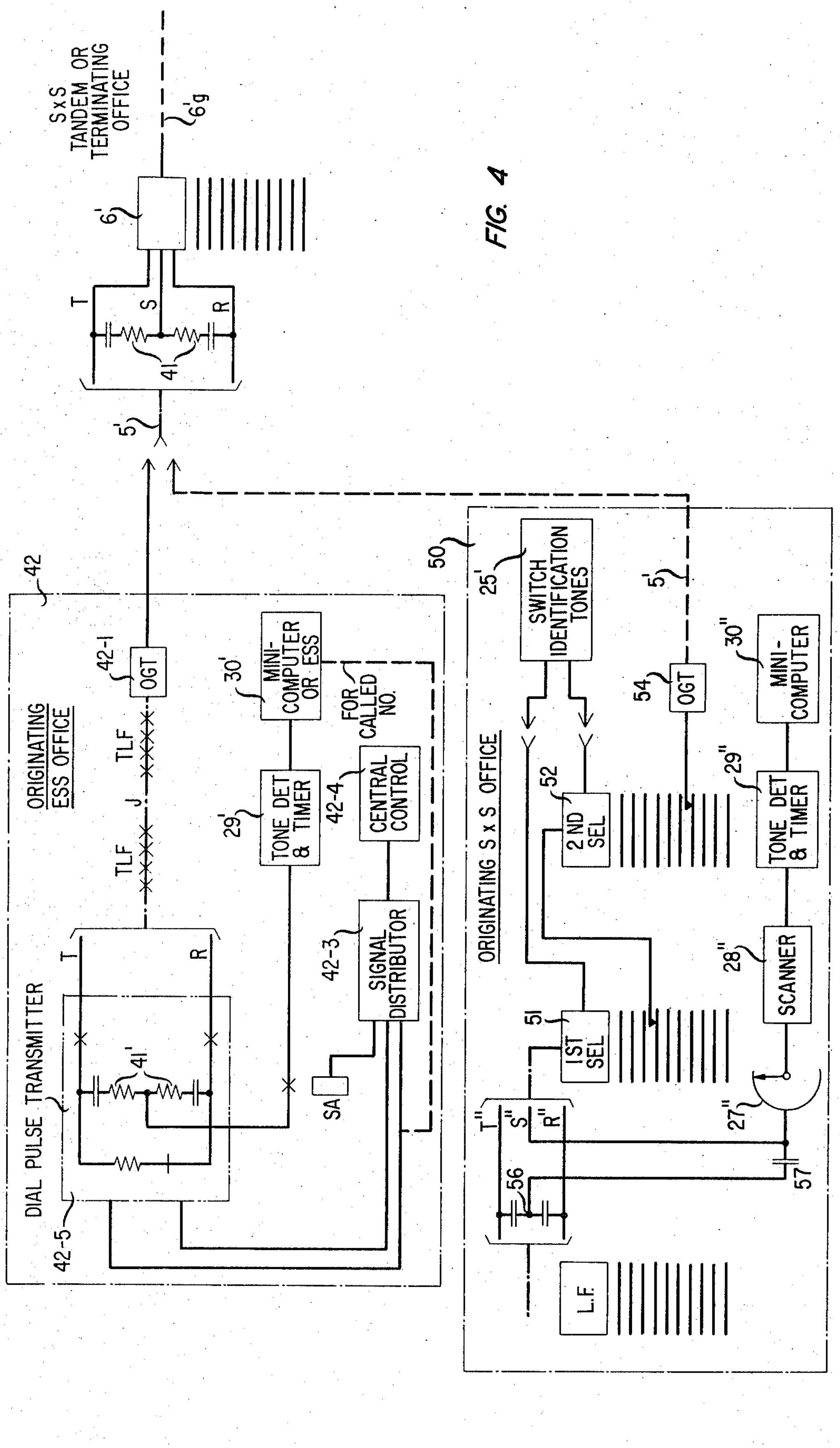
FIG. 4 shows the application of my invention to a remotely monitored step-by-step switching office.

FIG. 4 shows an arrangement whereby a step-by-step switching train in a tandem or terminating office may be monitored by a scanner-tone detector-minicomputer located either in a remote originating step-by-step, crossbar or electronic switching system (ESS) office. At the right-hand side of FIG. 4 is shown a selector stage 6′ of a remote central office. The central office to be monitored will be equipped as is the office of FIG. 1 with a tone distribution matrix 25 for applying unique identifying tones to the sleeve conductor but will not have the scanner and tone detector for locally recording selector identities. Instead trunk 5′ incoming to selector 6′ is modified by the inclusion of a coupling network 41 to couple the tone appearing on sleeve lead S to the tip and ring conductors T, R. If trunk 5′ is served by an originating ESS office 42, trunk 5′ terminates in outgoing trunk circuit 42-1 which appears on the trunk link frame TLF. An electronic switching office, as described, for example, in the September 1964 issue of the *Bell System Technical Journal* is a program controlled telephone switching machine wherein a stored program determines the sequence of switching operations. The relays in the trunks and service circuits in an electronic switching office are operated by a signal distributor 42-3 under control of the stored program central control unit 42-4.

When the originating ESS office 42 placed the call to the remote step-by-step central office, it selected outgoing trunk circuit 42-1 and at about the same time selected a dial pulse transmitter 42-5 to outpulse the called number digits. In accordance with my invention, the dial pulse transmitter 42-5 is modified by the inclusion of a coupling network 41' for "taking off" the unique identifying tones applied to the tip and ring leads of trunk 5' by the remote step-by-step office. The take-off point from the coupling network 41' is connected to tone detectors 29' over relay contact SA when relay SA is operated by signal distributor 42-3. Signal distributor 42-3 under control of central control 42-4 operates relay SA when the call is routed to a remote office equipped for call monitoring and incident to the selection of dial pulse transmitter 42-5 for use on the call. It is to be appreciated, that an electromechanical scanner 28' would not be required in an ESS office since trunks may be selected under control of the stored program control unit thereof.

As was previously mentioned, the operation of the selectors of the step-by-step central office may also be remotely monitored from an originating step-by-step office 50. Office 50 contains first and second selectors 51, 52 of its originating switching train each of which is supplied with a unique identifying tone by a local tone distribution matrix 25' similar to the tone distribution matrix in the remotely located office being monitored. The tones supplied to switching stages 51 and 52 will, of course, be different from those supplied to the switching stages 16, 19, and 9 of the remote office. The locally applied tones appear on local sleeve lead S'' and are detected on the bank 27'' of scanner 28'' by tone detectors and timer 29'' in the same manner as described for the detection of a tone on the sleeve lead S of FIG. 1.

After the connection has been extended from originating office 50 to the remote office being monitored over the path which includes outgoing trunk circuit 54 and trunk 5', the tones from the remote office are "taken off" the tip and ring conductors T'', R'' by decoupling network 56. The remote office identifying tones provided by network 56 are applied through capacitor 57 to the same point on the bank 27'' of scanner 28'' as the local tones appearing on the local sleeve S''.

Figure 5:
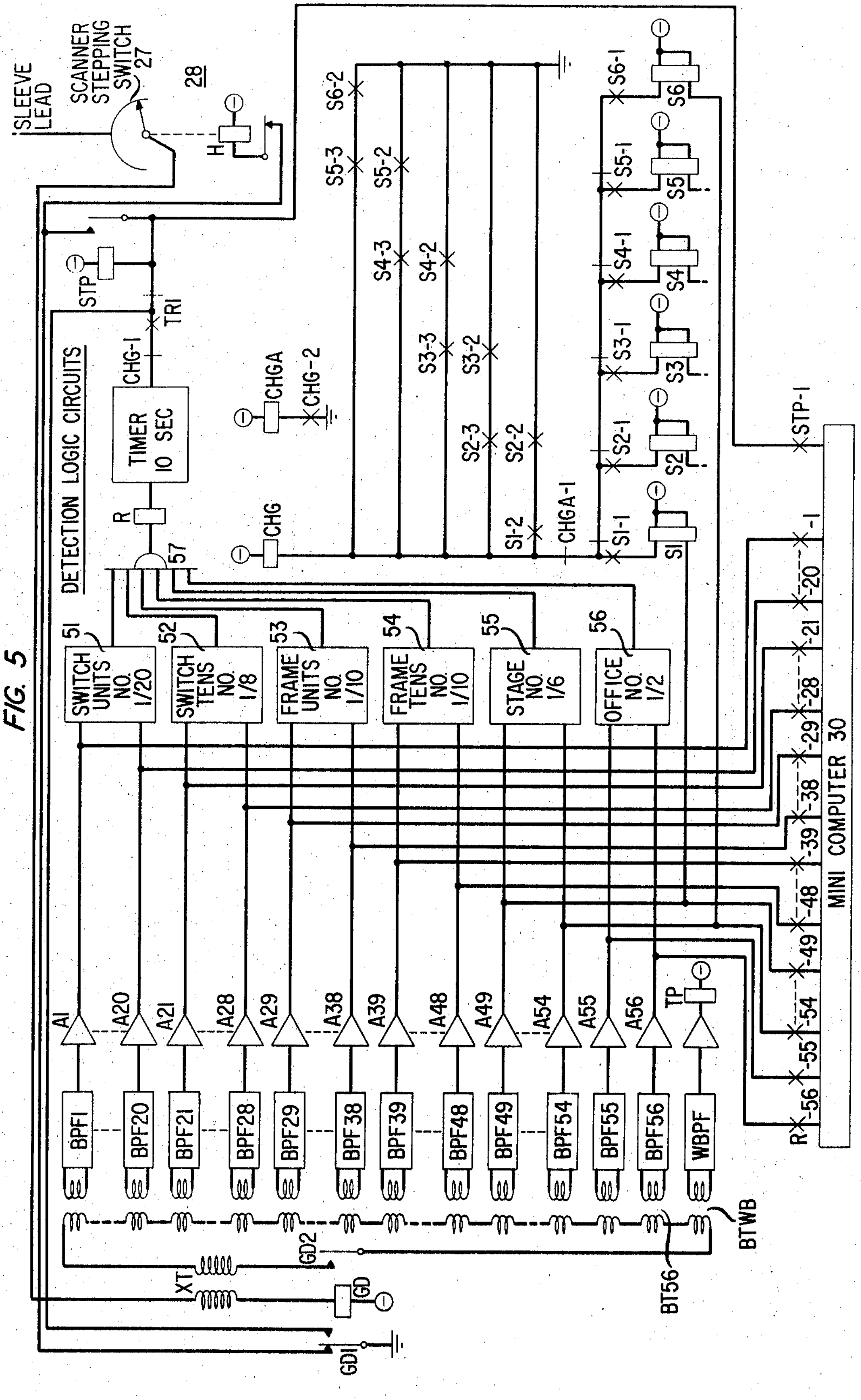
FIG. 5 shows the details of the scanner and tone detector circuits of FIG. 1.

Referring now to FIG. 5 there is shown the details of the scanner, tone detectors, and timer circuits of FIG. 1. Normally, scanner 28 under control of pulsing magnet H samples the sleeve leads of the trunks appearing on bank 27 in succession, passing-by any sleeve exhibiting the battery potential indicating an idle trunk. When scanner 28 arrives at a sleeve terminal exhibiting the ground potential of a busy trunk, relay GD is energized stopping the hunting operation by removing at its back contact GD1 the operating ground for pulsing magnet H. At its make contact GD2 ground detecting relay GD closes the secondary circuit path of transformer XT to the primaries of the 57 serially-connected windings BT1 through BT56 and BTWB. If the sleeve lead exhibiting the ground potential has a superimposed alternating current tone thereon that tone will be coupled via the serially connected array of 57 transformer windings BT1 through BT56 and BTWB into bandpass filters BPF1 through BPF56 and WBPF. The presence of any tone will be detected by wide bandpass filter WBPF to operate relay TP. Relay TP operated at the make contact of its transfer contacts TP-1 provides an enabling ground to start 10-second timer T10. This path may be traced as follows:

Ground, GD1, TP1, CHG1, timer T10. At the same time, bandpass filters BPF1 through BPF20 sense the presence of any of the 20 frequencies capable of designating the units digit of a selector switch number in the switching train being monitored. Detection logic 51 contains circuitry for assuring that one and only one of the 20 frequencies is present. If one and only one of the frequencies is present, detection logic 51 energizes its input to AND gate 57. Similarly, others of bandpass filters 21 through 56 detect the presence of the frequencies capable of designating to respective ones of detection logic circuits 52, 53, 54, 55, and 56 the tens digit of the switch number, the units digit of the frame number, the tens ditis of the frame number, the stage number and the office number. When all of its inputs are energized, AND gate 57 provides an enabling ground to relay R which does not operate as yet, however.

During the 10-second interval being timed by timer T10, relay GD will release if the call is abandoned, thereby permitting pulsing magnet H to commence restepping scanner 28.

One of relays S1–S6 will be operated by the tone indicating the number of the stage of the switching train currently being controlled by the dial pulse call signaling.

If, during the 10-second interval, the switching train being monitored advances its connection path to a subsequent stage, a higher-numbered one of relays S1 through S6 will operate until the lower-numbered one releases. The momentary operation of two successive ones of relays S1 through S6 provides a momentary ground operating to the winding of relay CHG. The momentary operation of relays CHG and its back contact CHG1 breaks the enabling ground for timer T10 resetting the timer. Relay CHGA is operated by contact CHG-2 when relay CHG operates. The path holding the lower numbered S- relay is more operated so that it may release. When the lower ordered one of relays S1 through S6 releases, relay CHG releases reestablishing the ground to start timer T10.

When the switching train being monitored extends its connection path to the final stage such as to connector 12 of FIG. 1 which is not supplied with the tone from common tone source 25, relay TP will release as there is no tone input to filter WBPF.

When timer T10 reaches 10 seconds, it energizes the other end of the winding of relay output and relay R operates. The operation of relay R cuts through leads when the outputs of amplifiers A1 through A56 to minicomputer 30. Minicomputer 30 records the identity of the selector stage which caused timer T10 to time out. When the minicomputer has recorded the information it returns a ground on lead STP to operate relay STP at whose contact STP1 an alternative operating path is provided to stepping relay H thereby to advance the scanner to resume its scanning of the sleeve leads appearing on the bank 27.

Accordingly, I have shown an arrangement for monitoring the operation of the selectors of a step-by-step switching train during each interval of time that the selectors are normally controlled to respond to their respective sequence of dial pulses. Properly operating selectors remove their identifying tones when they have forwarded the connection to succeeding switching stages. Improperly operating selectors maintain their identifying tones on the sleeve lead beyond the normal dial pulse responsive interval and so may be detected after a predetermined time-out.

In the description of the illustrative embodiment, the tone detector and timer circuit 29 has been described as one in which entries are recorded in the minicomputer only when stages are reached that cause timer T10 to time out. This mode of operation gives precise trouble information to the minicomputer. The lower-numbered winding relay R, however, may be wired so that it will cut through the output of amplifiers A1 through A56 to minicomputer 30 whenever AND gate 57 is activated. In this manner, it would be possible to record the sequence of selectors used on each monitored connection for traffic purposes, i.e., whether or not that stage caused a time out of timer T10. Such mode of operation would be useful to monitor whether the graded multiple wiring of the selectors of the switching train has been installed as engineered, that all selectors are eventually used in handling traffic and how often they are used. The additional fact of timer T10 time out could be indicated to minicomputer 30 by additional lead cut through by an additional contact of relay R, the ground being applied to this lead from the output of timer T10.

For the sake of simplicity, an electromechanical scanner 28 has been shown. It will be obvious to one skilled in the art that any number of electronic scanning devices could be substituted. Further and other modifications will be apparent to those skilled in the art without departing from the spirit and scope of the invention.

What is claimed is:

1. In a step-by-step switching train having a dial pulse responsive selector switch including a slow release relay one of whose contacts normally applies a temporary holding ground potential to the sleeve lead of prior stages of the switching train, the arrangement comprising path means including said contact for superimposing a unique identifying audio frequency tone over said ground potential applied to said sleeve lead, and means for scanning a preceding stage of said switching train to detect said tone.

2. In a step-by-step switching train according to claim 1, the arrangement wherein said slow release relay contact normally applies said holding ground during the time dial pulses are being applied to said dial pulse responsive selector switch, wherein said means for scanning includes timing means for indicating the occurrence of a normal selector switch dial pulse responsive interval, and means associated with said scanning means for determining when said audio frequency tone remains on said sleeve lead for longer than said normal dial pulse responsive interval.

3. In a step-by-step switching train according to claim 2, the combination further including means controlled by said scanner means and said tone detecting means for recording the identity of a selector switch identified by said unique audio frequency tone.

4. In a step-by-step switching train according to claim 2, the combination further comprising a telephone central office remote from said step-by-step switching train, said means for scanning being located at said remote central office, a dial pulse transmitting trunk interconnecting said telephone central office with said switching train, and means at said switching train for transferring said audio frequency tones appearing on said sleeve lead to said trunk.

5. In a step-by-step central office having a plurality of multiple path switching stages wherein a step-by-step selector switch in a given stage applies a holding ground to the sleeve conductor to maintain the connection established through preceding stages until it has completed the selection of a subsequent stage, an arrangement for verifying the operation of the selectors in each of said stages, comprising a source of distinctive combinations of tone frequencies, respective ones of said frequencies identifying the central office, switching stage, switching frame, shelf, and switch position in said frame of said switch, means for superimposing one of said distinctive combinations of frequencies of said holding ground applied by said selector, and means for scanning said paths to detect said tone frequencies.

6. An arrangement according to claim 5 wherein said source of tone frequencies comprises a first and second array of transformer windings, predetermined windings of said first array being connected by low impedance coupling means to said sleeve conductor, and predetermined windings of said second array being connected by low impedance coupling means to predetermined windings of said first array.

7. An arrangement according to claim 6 wherein said first array includes windings for supplying frequencies indicative of the units digit numbers and windings for supplying frequencies indicative of the tens digit numbers of the switches of said stages; and wherein said low impedance coupling means bridges predetermined ones of said switch number indicative tens and units digit windings.

8. An arrangement according to claim 7 wherein said superimposing means includes ground supply means in circuit with said tens digit and units digit indicative windings.

9. An arrangement according to claim 6 wherein said source of tone frequencies further comprises a transformer winding in series with one of said arrays of switch number digit indicative windings for supplying a frequency indicative of the switching stage of a group of said selectors.

10. An arrangement according to claim 5 wherein said scanning means includes means for sequentially examining the sleeve conductors of an input stage of said central office to detect a sleeve conductor exhibiting one of said combinations of tone frequencies, timer means for indicating the occurrence of a predetermined interval, and means for recording the persistence of said one of said combinations of tone frequencies after the end of said predetermined interval.

11. An arrangement according to claim 10 wherein said detecting means includes means for recognizing a tone frequency among said combination of tone frequencies which identifies the operation of a predetermined selector stage, means controlled by said recognizing means and said timer means for allowing said scanner means to scan another of said sleeve conductors when said recognizing means indicates that said selector is in the last stage of said office, and means for maintaining said scanning means in connection with said sleeve lead when said recognizing means indicates said selector is in a stage preceding said last stage.

12. An arrangement for ascertaining which switch of a plurality of alternative-path-establishing switches in a multiple stage switching train for connecting a trunk to any of a plurality of telephone lines is currently being controlled by signals transmitted over said trunk, in which each switch temporarily applies a holding signal over the path being set up and until a successive switch has been designated, comprising means associated with each said switch for superimposing on the connection path holding signal a plurality of a.c. tones uniquely identifying said switch while said switch is responding to said signals, and means for receiving said plurality of alternating current tones at said incoming trunk.

13. An arrangement according to claim 12 wherein said switches are controlled by dial pulses transmitted over said trunk, wherein the controlled one of said switches normally applies a holding ground to the sleeve lead of said path being set up, and wherein said superimposing means includes transformer winding means in circuit with said sleeve lead holding ground.

14. An arrangement according to claim 13 wherein said means for receiving said plurality of tones includes a plurality of bandpass filters each tuned to detect a predetermined one of said plurality of tones, logic means for indicating the appearance of a tone in predetermined groups of said bandpass filters, and means controlled by said logic means for recording an indication of the appearance of each said tone.

15. An arrangement according to claim 14 wherein said receiving means includes timing means set by one of said filters and means for resetting said timing means when a tone indicating the extension of said switching train connection to a subsequent stage is detected.

16. An arrangement according to claim 15 wherein said resetting means includes means responsive to the appearance of a tone signal indicating the control of a predetermined selector switch stage in said switching train, means for detecting the appearance of a tone from a stage subsequent to said selector switch stage, and means controlled by said subsequent stage tone detecting means for releasing said indicating means.

17. An arrangement according to claim 13 further including means for scanning each trunk of said switching train, and wherein said means for receiving said plurality of tones includes means responsive to the appearance of any of said tones for stopping said scanning and timing the interval during which said tones persist.

18. An arrangement according to claim 17, further including means subsequently responsive to the disappearance of all of said tones for restarting said scanner means.

* * * * *